Feb. 9, 1932. C. T. PFLUEGER 1,844,044
FISHING ROD
Original Filed Jan. 17, 1927
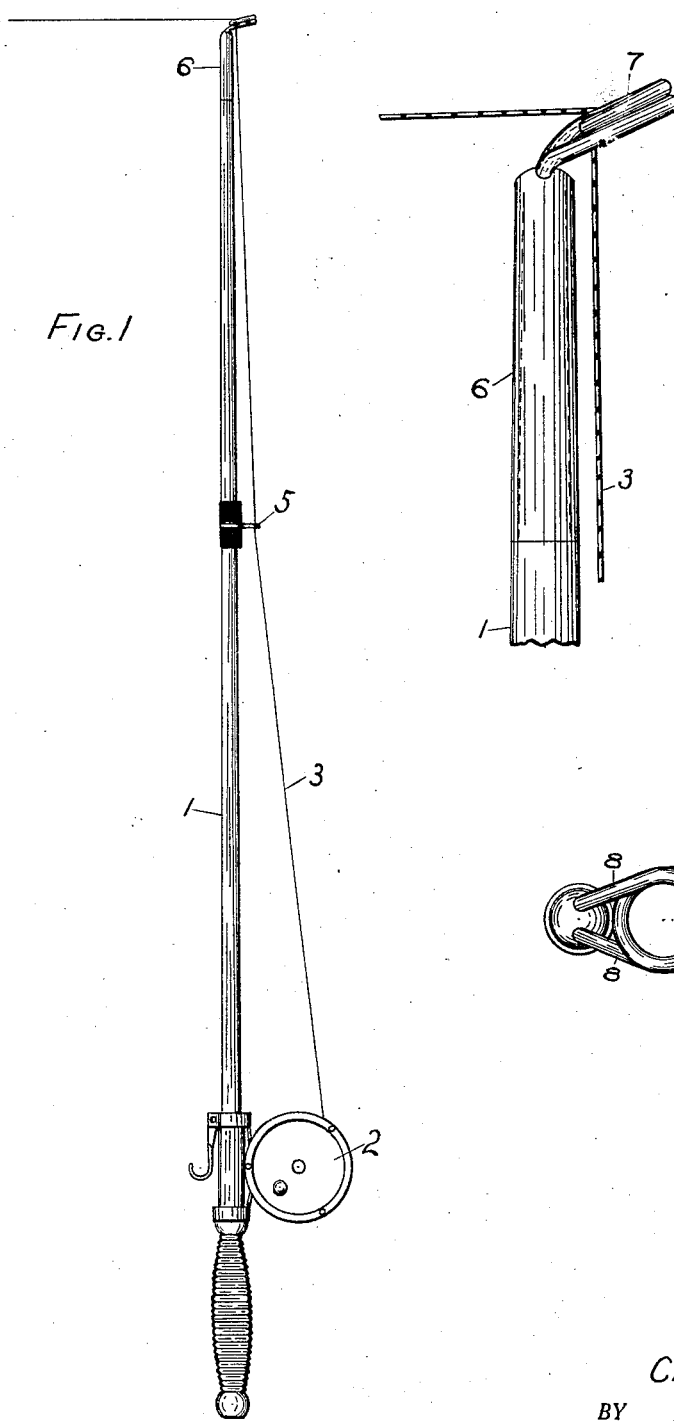
INVENTOR.
CHARLES T. PFLUEGER
BY Ely & Barrow
ATTORNEYS Patented Feb. 9, 1932

1,844,044

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

FISHING ROD

Original application filed January 17, 1927, Serial No. 161,478. Divided and this application filed June 4, 1928. Serial No. 282,598.

This invention relates to fishing rods and particularly to the means for guiding the line at the tip of the rod. The object of the invention is to improve upon the line guide in such a way that the line will at all times be maintained out of contact with the tip or ferrule and thereby avoid wearing of the tip by the passage of the line. In conjunction with this object, the line guide is made so that it will shed the line easily and quickly, thereby avoiding knotting or tangling of the line about the tip. The objects are accomplished by an extremely simple and effective arrangement, as will be fully described and set forth, details of the invention being subject to change or alteration within the scope of the invention as set forth in the claims.

The present application is a division of my prior application Serial No. 161,478, filed January 17, 1927.

In the drawings, in which the preferred form of the invention is shown:

Figure 1 is a side elevation of a fishing rod with the new and improved line guide mounted thereon;

Figure 2 is an enlarged view of the upper end of the rod showing the ferrule and line guide; and Figure 3 is a plan view of the parts shown in Figure 2. In the drawings, the rod is shown at 1, the reel at 2 and the line at 3. At a midway point on the rod is located the guide 5 and over the end of the rod is received the metal tip or ferrule 6 which protects the end of the rod.

To the ferrule is attached, by soldering or otherwise, the end line guide 7. This line guide is formed from a single wire which projects beyond the end of the ferrule and at an angle to the axis of the rod. The wire is formed with straight portions 8 which merge into a double loop 9, the base of the loop or coil being thereby spaced outwardly of the ferrule in both directions. By the arrangement described, the line is maintained out of contact both with the side and tip of the ferrule so that it cannot rub over the metal surface, thereby avoiding wearing away of the ferrule. The angular position of the line guide not only serves the useful purpose of maintaining the line spaced from the ferrule at all times, but, in combination with the straight portions 8 extending from the tip of the rod and tangent to the loop, makes a perfect line shedding device so that the line cannot be knotted about the line guide. If the line is looped over the guide, it will slide off along the straight side thereof, the angular setting of the loop facilitating this action.

What is claimed is:

1. The combination of a fishing rod having a ferrule upon the tip, and a line guide on the tip of the ferrule extending outwardly thereof, the plane of the guide being at an angle to the axis of the rod, said line guide being provided with straight sides and having a coil elevated above the surface of the ferrule, the innermost point of the coil being offset outwardly and laterally from the ferrule.

2. The combination of a fishing rod having a ferrule upon the tip, and a line guide on the tip of the ferrule, said guide being formed of a single wire the ends of which are attached to the ferrule, the body of the wire being formed into a coil, the plane of which extends outwardly of the ferrule and at an angle to the axis of the rod, the innermost portion of the coil being spaced from the end of the ferrule both outwardly and laterally therefrom.

3. The combination of a fishing rod having a ferrule upon the tip, and a line guide on the tip of the ferrule, said guide being formed of a single wire the ends of which are attached to the ferrule, the body of the wire being formed into a coil, the plane of which extends outwardly of the ferrule and at an angle to the axis of the rod, the innermost portion of the coil being spaced from the end of the ferrule both outwardly and laterally therefrom, that portion of the wire between the ferrule and the coil being tangent to the coil.

4. A line guide for attachment to the tip of a fishing rod, consisting of a single piece of wire the ends of which are formed to be connected to the tip of the rod and the body of which is formed into a coil, the end portions of the wire being tangent to the coil.

5. A line guide for attachment to the tip of a fishing rod, consisting of a single piece of wire the ends of which are formed to be attached to the tip of the rod and the body of which is formed into a coil, the end portions of the wire being tangent to the coil and the plane of the coil being arranged at an angle to the axis of the rod.

6. A line guide for attachment to the tip of a fishing rod, consisting of a single piece of wire the ends of which are to be attached to the tip of the rod and the body of which is formed into a coil, the end portions of the wire being tangent to the coil, the plane of the coil being arranged at an angle to the axis of the rod and the innermost point of the coil being spaced both laterally and forwardly of the tip of the rod.

CHARLES T. PFLUEGER.